(12) United States Patent
Park

(10) Patent No.: US 8,367,994 B2
(45) Date of Patent: Feb. 5, 2013

(54) OPTICAL MODULE, WHICH IS ABLE TO FIRE A BEAM

(75) Inventor: Il Hung Park, Sungnam (KR)

(73) Assignees: EWHA University-Industry Collaboration Foundation, Seoul (KR); Sense Technology, Seoul (KR)

( * ) Notice: Subject to any disclaimer, the term of this patent is extended or adjusted under 35 U.S.C. 154(b) by 400 days.

(21) Appl. No.: 12/675,870

(22) PCT Filed: Jul. 19, 2008

(86) PCT No.: PCT/KR2008/004233
§ 371 (c)(1),
(2), (4) Date: Mar. 2, 2010

(87) PCT Pub. No.: WO2009/028796
PCT Pub. Date: Mar. 5, 2009

(65) Prior Publication Data
US 2010/0237226 A1    Sep. 23, 2010

(30) Foreign Application Priority Data

Aug. 28, 2007   (KR) ................. 10-2007-0086693

(51) Int. Cl.
*G01J 1/20* (2006.01)
*G02B 26/00* (2006.01)
*G01S 17/06* (2006.01)
(52) U.S. Cl. ..................... 250/203.2; 359/857
(58) Field of Classification Search ............... 250/201.1, 250/203.1, 203.2, 203.3, 203.6, 206.1, 206.2; 359/850, 857
See application file for complete search history.

(56) References Cited

U.S. PATENT DOCUMENTS

| | | | | |
|---|---|---|---|---|
| 5,300,780 A * | 4/1994 | Denney et al. | ................ | 250/342 |
| 5,585,622 A * | 12/1996 | Durst et al. | ................ | 250/208.2 |
| 5,796,474 A * | 8/1998 | Squire et al. | ............... | 356/152.1 |
| 6,215,396 B1 | 4/2001 | Script | | |
| 6,348,691 B1 | 2/2002 | Sandell et al. | | |
| 6,495,827 B2 * | 12/2002 | Metcalf et al. | ................ | 250/330 |
| 6,723,975 B2 * | 4/2004 | Saccomanno | .............. | 250/203.6 |
| 7,312,429 B2 * | 12/2007 | Guyer et al. | ............... | 250/203.6 |
| 7,385,759 B2 * | 6/2008 | Pasternak et al. | ............. | 359/429 |
| 7,597,489 B2 * | 10/2009 | Horak et al. | ................ | 396/358 |
| 7,746,450 B2 * | 6/2010 | Willner et al. | .................. | 356/28 |
| 8,186,839 B2 * | 5/2012 | Park et al. | ..................... | 359/846 |
| 2006/0283317 A1 * | 12/2006 | Melnychuk et al. | .......... | 89/41.03 |
| 2007/0114286 A1 * | 5/2007 | Oliva et al. | ............... | 235/462.36 |
| 2008/0186605 A1 * | 8/2008 | Park et al. | .................... | 359/857 |
| 2009/0059201 A1 * | 3/2009 | Willner et al. | ............... | 356/5.01 |
| 2010/0237226 A1 * | 9/2010 | Park | ......................... | 250/203.1 |

* cited by examiner

*Primary Examiner* — John Lee
(74) *Attorney, Agent, or Firm* — Jefferson IP Law, LLP

(57) ABSTRACT

An optical module is disclosed. The optical module includes: (1) a mirror part for controlling its reflection angle in an analog method; (2) an aperture for controlling an amount of light incident to the mirror part, the aperture being installed facing the mirror part; (3) a detector for detecting an optical signal from a light transmitted from the mirror part; (4) a beam emitter for emitting a beam, the beam emitter being adjacently installed to the optical signal detector; and (5) a controller for controlling the mirror part so as to locate an object, detected by the optical signal detector, at the center portion of the optical signal detector, and for controlling the beam emitter and the mirror part so as to emit a beam from the beam emitter to the object detected by the optical signal detector. The optical module can observe an object both in a wide field of view (FOV) and in detail, effectively track a rapidly moving object, and emit a beam to the object.

6 Claims, 5 Drawing Sheets

(a) event or moving object

[Fig. 6]

(b) event or moving object

OPTICAL MODULE, WHICH IS ABLE TO FIRE A BEAM

TECHNICAL FIELD

The present invention relates to optical modules. More particularly, this invention relates to an optical module that can observe an object both in a wide field of view (FOV) and in detail, effectively track a rapidly moving object, and emit a beam to the object. The optical module includes a mirror part for controlling a reflection angle in an analog method, a detector for detecting an optical signal from light transmitted from the minor part, a beam emitter, adjacently installed to the optical signal detector, for emitting a beam, and a controller for controlling the mirror part and the beam emitter so that the minor part emits a beam towards an object detected by the optical signal detector.

BACKGROUND ART

An optical module is a component of optical systems. If such an optical module can track the movement of a moving object, especially a rapidly moving object, and emit a beam toward the object, there may be many useful applications in everyday life. First, the type of optical module has potential applications inside the home. For example, if harmful insects, such as mosquitoes, etc., enter a house, the optical module tracks the movement of the insects and then emits a beam to the insects to kill them, which will be preferable rather than the conventional method that burns mosquito-repellent and emits a strong smell while removing the insects. There are also additional applications. If a thief or a burglar breaks into a building, the optical module tracks their movement and emits a beam towards them, so as to produce an alarm or stop them. In that case, the optical module can contribute to crime prevention or subdue criminals. Furthermore, we can find other applications for this device in military areas. If a missile is emitted from an enemy, the optical module tracks the movement of the missile and emits a beam towards it, so that it can be shot down in the air. In that case, the optical module can be a good means of military defense. In order to realize the applications described above, it is necessary to implement an optical module that can track a rapidly moving object.

Meanwhile, micro-electro-mechanical systems (MEMS) have also come under the spotlight. MEMS are a computer combined with a small mechanism, such as a sensor valve, a gear, a reflector and a semiconductor chip manipulator, etc. MEMS, also referred to as a smart meter, are a device with a microcircuit in a small silicon chip, installed into mechanical apparatuses such as reflectors or sensors. For example, MEMS are utilized in a variety of applications, such as a device that inflates an air bag to match a passenger's weight with a vehicle's speed detected by the air bag, a global positioning system (GPS) sensor that reads a continuous track and a treatment process for freight transportation, an interactive sensor for sensing changes in the air flow on the surface of airplane wings according to the air resistance and performing a corresponding operation according to the sensed result, an optical switch for outputting an optical signal at 20 nanometers per second, a sensor-manipulated heating/cooling device, and a sensor installed in a building for changing the flexibility of matter that reacts to atmospheric pressure. In particular, it is necessary to apply a micro-mirror or a micro-minor array, manufactured according to optical MEMS technology, to the optical module described above, which can track a rapidly moving object and emit a beam towards the object.

DISCLOSURE OF INVENTION

Technical Problem

The present invention solves the above problems, and provides an optical module that can emit a beam, observe an object both in a wide field of view (FOV) and in detail, and effectively track a rapidly moving object, where the optical module is configured to include a mirror part for controlling a reflection angle in an analog method, a detector for detecting an optical signal from light transmitted from the mirror part, a beam emitter, adjacently installed to the optical signal detector, for emitting a beam, and a controller for controlling the mirror part and the beam emitter so that the minor part emits a beam towards an object detected by the optical signal detector.

Technical Solution

In accordance with an exemplary embodiment of the present invention, the present invention provides an optical module including: (1) a minor part for controlling its reflection angle in an analog method; (2) an aperture for controlling an amount of light incident to the mirror part, the aperture being installed facing the mirror part; (3) a detector for detecting an optical signal from a light transmitted from the minor part; (4) a beam emitter for emitting a beam, the beam emitter being adjacently installed to the optical signal detector; and (5) a controller for controlling the mirror part so as to locate an object, detected by the optical signal detector, at the center portion of the optical signal detector, and for controlling the beam emitter and the mirror part so as to emit a beam from the beam emitter to the object detected by the optical signal detector.

Preferably, the optical module may further include: a second mirror part whose reflection angle is controlled in an analog method and has a different field of view angle with respect to the first mirror part; and a second aperture for controlling amount of light incident to the second mirror part, the second aperture installed facing and corresponding to the second mirror part. Here, the controller controls the second mirror part so as to locate an object, detected by the optical signal detector through the second mirror part, at the center portion of the optical signal detector, and controls the beam emitter and the second mirror part so as to emit a beam from the beam emitter to the object that is detected by the optical signal detector through the second mirror part.

Preferably, the optical module may further include at least one or more mirrors for changing an optical path between the minor part and the optical signal detector.

Preferably, the second mirror part is a micro-mirror or a micro-mirror array to which micro-electro-mechanical systems are applied, rapidly operates its tilting angle to control its reflection angle in an analog method, and has a relatively large tilting angle.

Advantageous Effects

As described above, the optical module, according to the present invention, can emit a beam, observe an object both in a wide field of view (FOV) and in detail, and effectively track a rapidly moving object, where the optical module is configured to include a mirror part for controlling a reflection angle in an analog method, a detector for detecting an optical signal from light transmitted from the minor part, a beam emitter, adjacently installed to the optical signal detector, for emitting a beam, and a controller for controlling the mirror part and the beam emitter so that the minor part emits a beam towards an object detected by the optical signal detector. Based on these functions, it can be applied to a variety of industrial areas.

BRIEF DESCRIPTION OF DRAWINGS

The features and advantages of the present invention will be more apparent from the following detailed description in conjunction with the accompanying drawings, in which:

FIG. 6 is a plane view illustrating an optical module according to a third embodiment of the present invention, where the optical path is changed by a reflection mirror.

Figure 1:
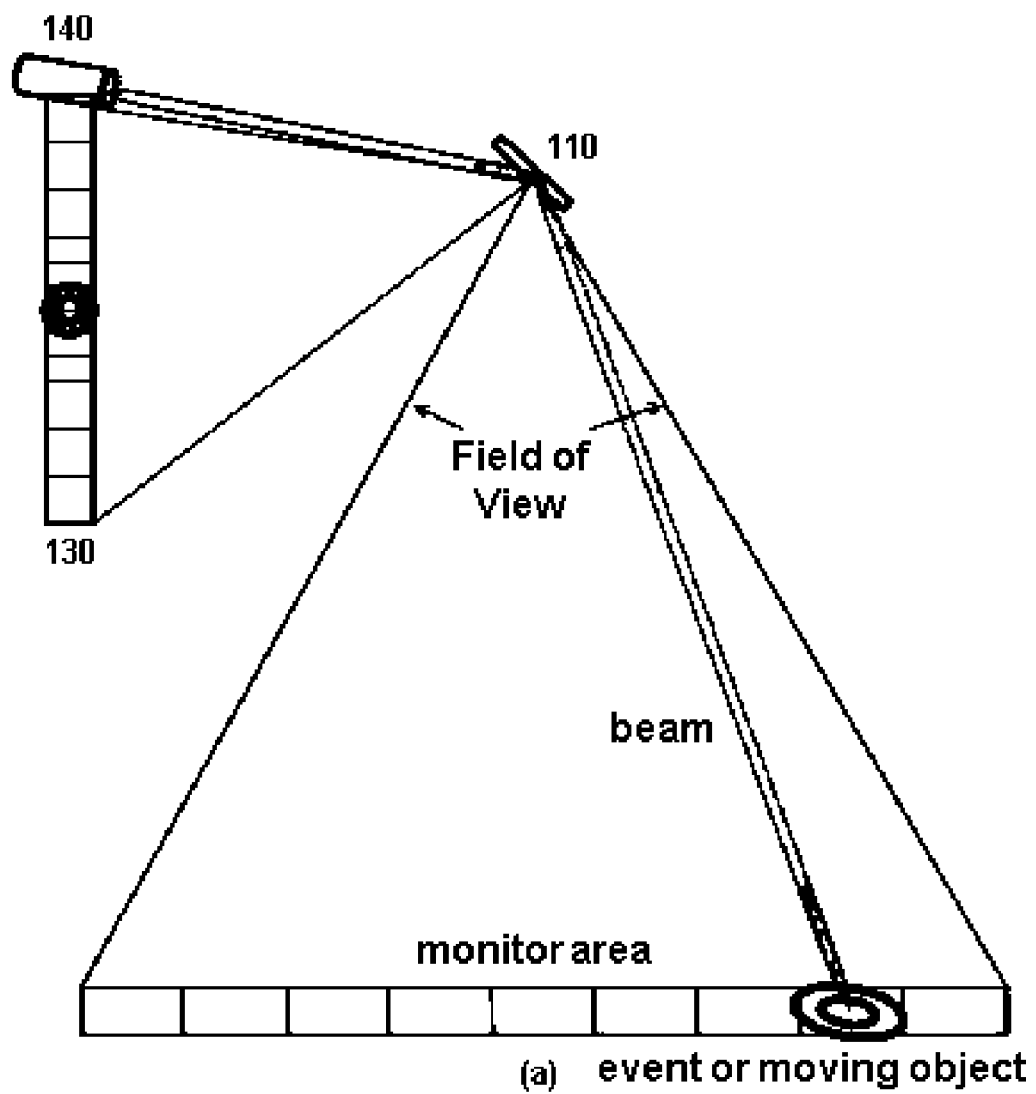
FIG. 1 is a plane view illustrating an optical module according to a first embodiment of the present invention.

BRIEF DESCRIPTION OF SYMBOLS IN THE DRAWINGS 110, 210a, 310: mirror part
120, 220a: aperture
210b: second mirror part
220b: second aperture
130, 230, 330: optical signal detector
140, 240, 340: beam emitter

BEST MODE FOR CARRYING OUT THE INVENTION

Now, preferred embodiments of the present invention will be described in detail with reference to the accompanying drawings.

Figure 2:
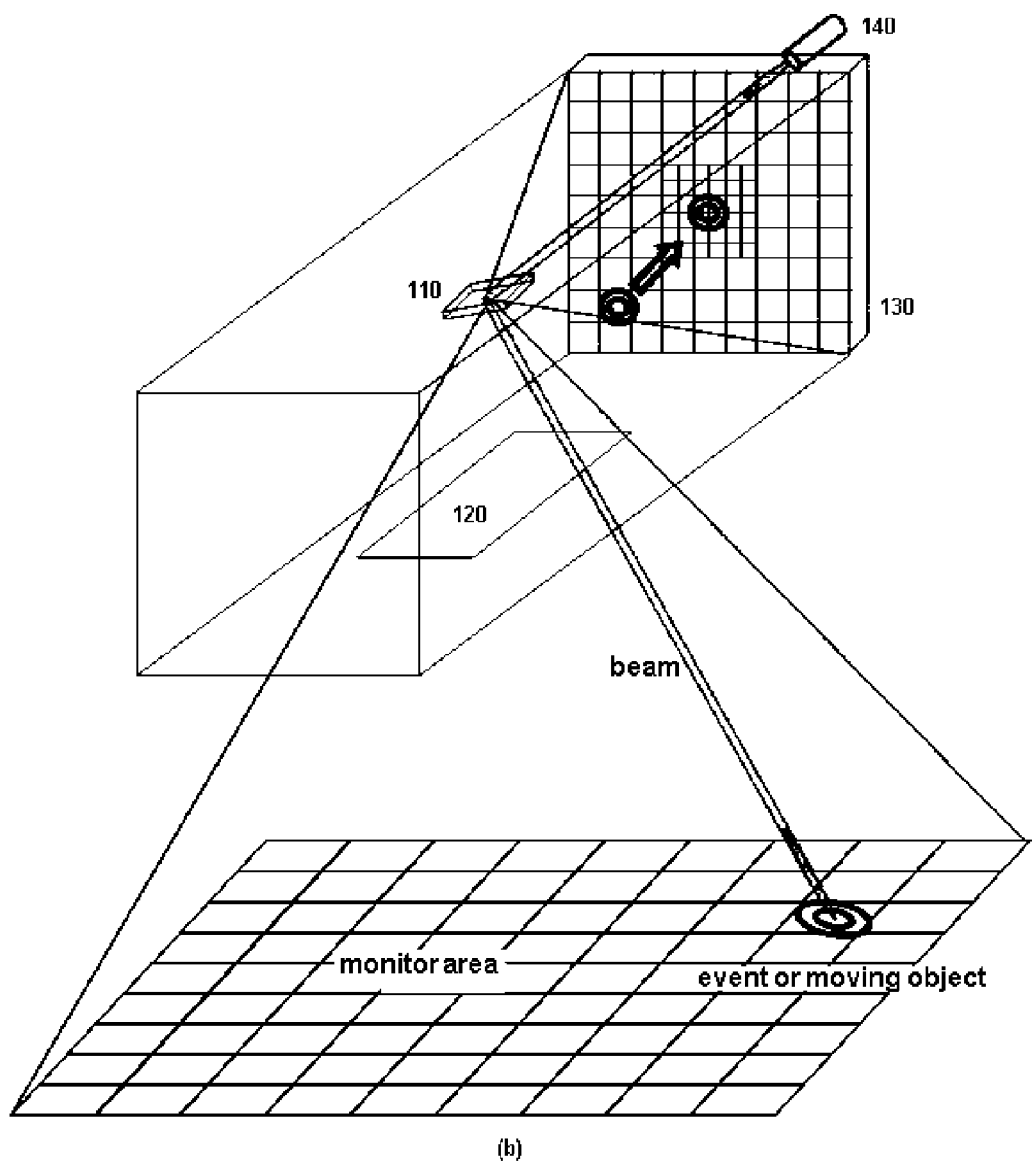
FIG. 2 is a three-dimensional view illustrating an optical module according to a first embodiment of the present invention.

FIG. 1 is a plane view illustrating an optical module according to a first embodiment of the present invention and FIG. 2 is a three-dimensional view illustrating an optical module according to a first embodiment of the present invention. As shown in FIGS. 1 and 2, the optical module includes: a mirror part 110 for controlling a reflection angle in an analog method; an aperture 120 for controlling an amount of light incident to the minor part 110, the aperture 120 facing the minor part 110; a detector 130 for detecting an optical signal from light transmitted from the mirror part 110; and a beam emitter 140, adjacently installed to the optical signal detector 130, for emitting a beam. Although it is not shown in FIGS. 1 and 2, the optical module according to an embodiment of the present invention further includes a controller for controlling the mirror part 110 so as to locate an object, detected by the optical signal detector 130, at the center portion of the optical signal detector 130 and for controlling the beam emitter 140 and the mirror part 110 so as to emit a beam from the beam emitter 140 to the object detected by the optical signal detector 130, if the object is ascertained as a target object.

The minor part 110 serves to transmit an optical signal of an object to be observed to the optical signal detector 130 at a reflection angle that is controlled by the controller. It also serves to reflect a beam emitted from the beam emitter 140 to the object at a reflection angle that is controlled by the controller. The minor part 110 can change its reflection angle in an analog method, so that an optical path of an image for an object can be directed to the optical signal detector 130, and a path of a beam emitted from the beam emitter 140 can be directed to the object. When a detected object rapidly moves, the mirror part 110 can control its reflection angle in an analog method so that the object can be effectively tracked and observed. In particular, as the minor part 110 rapidly changes its tilting angle, the reflection angle can be controlled in an analog method. Furthermore, it is preferable to use a micro-mirror or a micro-mirror array to which MEMS technology is applied to, because such a mirror can be rotated with a relatively large angle.

The aperture 120 is installed to the mirror part 11 and serves to control an amount of light incident to the mirror part 110. The aperture 120 may include an aperture collimator (not shown).

The optical signal detector 130 detects an optical signal from a light reflected from the minor part 110. As shown in FIGS. 1 and 2, when an event or a moving object is detected within an FOV angle or a monitoring area, in which the FOV angle is determined by the mirror part 110 and the aperture 120, the controller changes the reflection angle of the mirror part 110 so that the event or the moving object can be located at the center portion of the optical signal detector 130. The optical signal detector 130 does not limit its detectable range of optical signals.

The beam emitter 140 emits a beam to the detected object. The beam may be a laser beam, etc. As shown in FIGS. 1 and 2, the beam emitter 140 is adjacently installed to the optical signal detector 130. This is because the optical signal detector 130 observes an object in detail. In particular, if the movement of the object is tracked, the optical signal detector 130 allows the beam emitter 140 to emit a beam to the object at the reflection angle of the mirror part 110, as it is, i.e., without changing the reflection angle. Although the embodiment of the present invention is implemented in such a way that the reflection angle of the minor part 110 for the beam emitter 140 is not changed when the beam emitter 140 emits a beam, it will be appreciated that the reflection angle can be slightly adjusted if necessary. According to which type of beams the beam emitter 140 employs, the beam emitter 140 may completely eliminate an object or just emit a warning.

The controller controls the mirror part 110 so that an object is located at the center portion of the optical signal detector 130. When an object detected by the optical signal detector 130 is determined as a target object, the controller controls the beam emitter 140 and the minor part 130 so that the beam emitter 140 can emit a beam to the detected object. If the reflection angle of the mirror part 110 for the optical signal detector 130 is used, as it is, i.e., without the change, the controller does not need to control the minor part 110. However, if necessary, the controller may control the mirror part 110 so that the optical path can be precisely guided to the object. The controller also serves to control the entire system. It will be appreciated that the present invention may be implemented in such a way that respective controllers can control the system and the optical module.

Although not show in FIGS. 1 and 2, the optical module 100 according to the present invention may be used with a data storage unit, an interface unit, a power supply, etc. The data storage unit stores detected optical signals, and may be implemented with a flash memory, hard disc, etc. The interface unit connects between parts and may be implemented with a bus interface, etc. The power supply supplies power to parts in the system.

Figure 3:
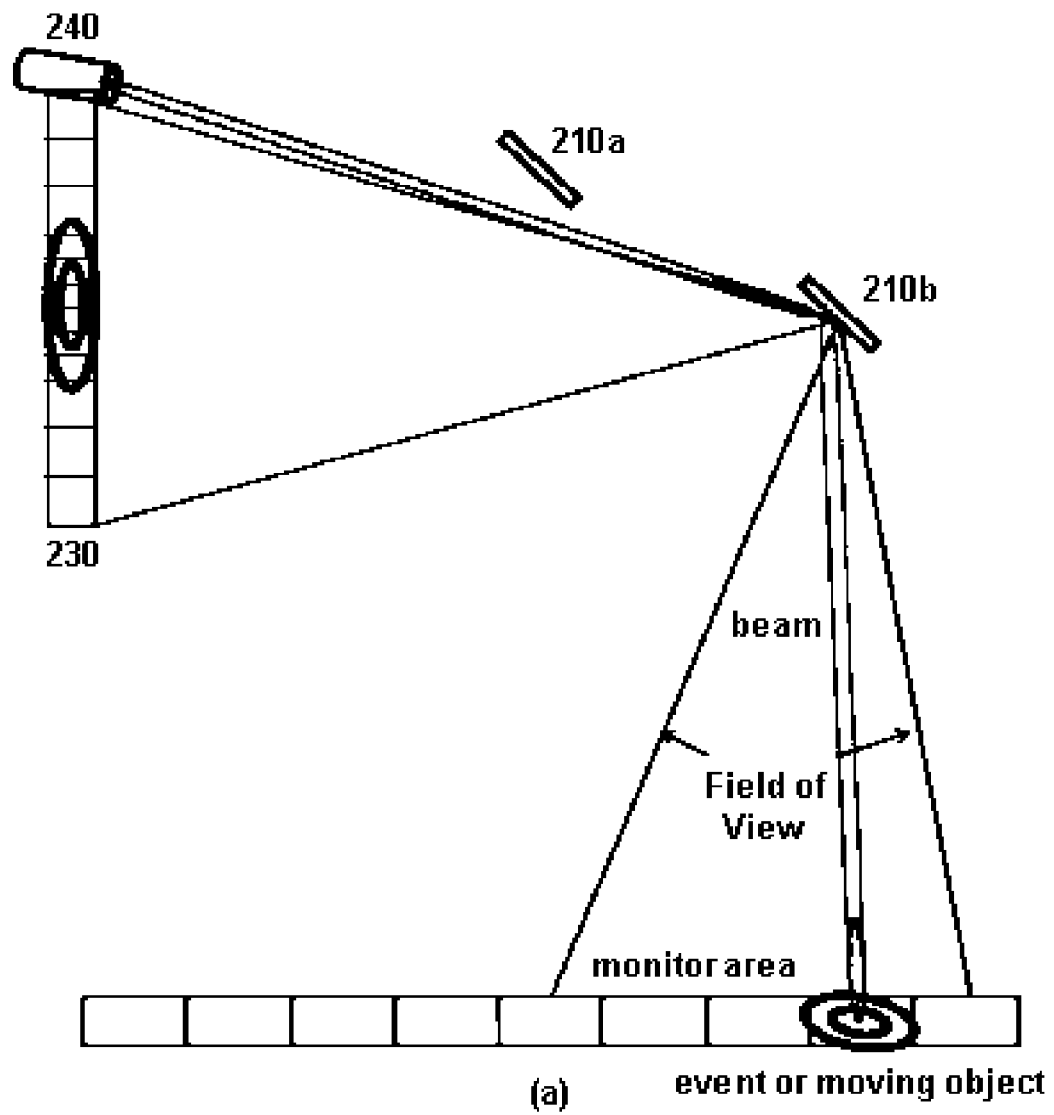
FIG. 3 is a plane view illustrating an optical module according to a second embodiment of the present invention.
Figure 4:
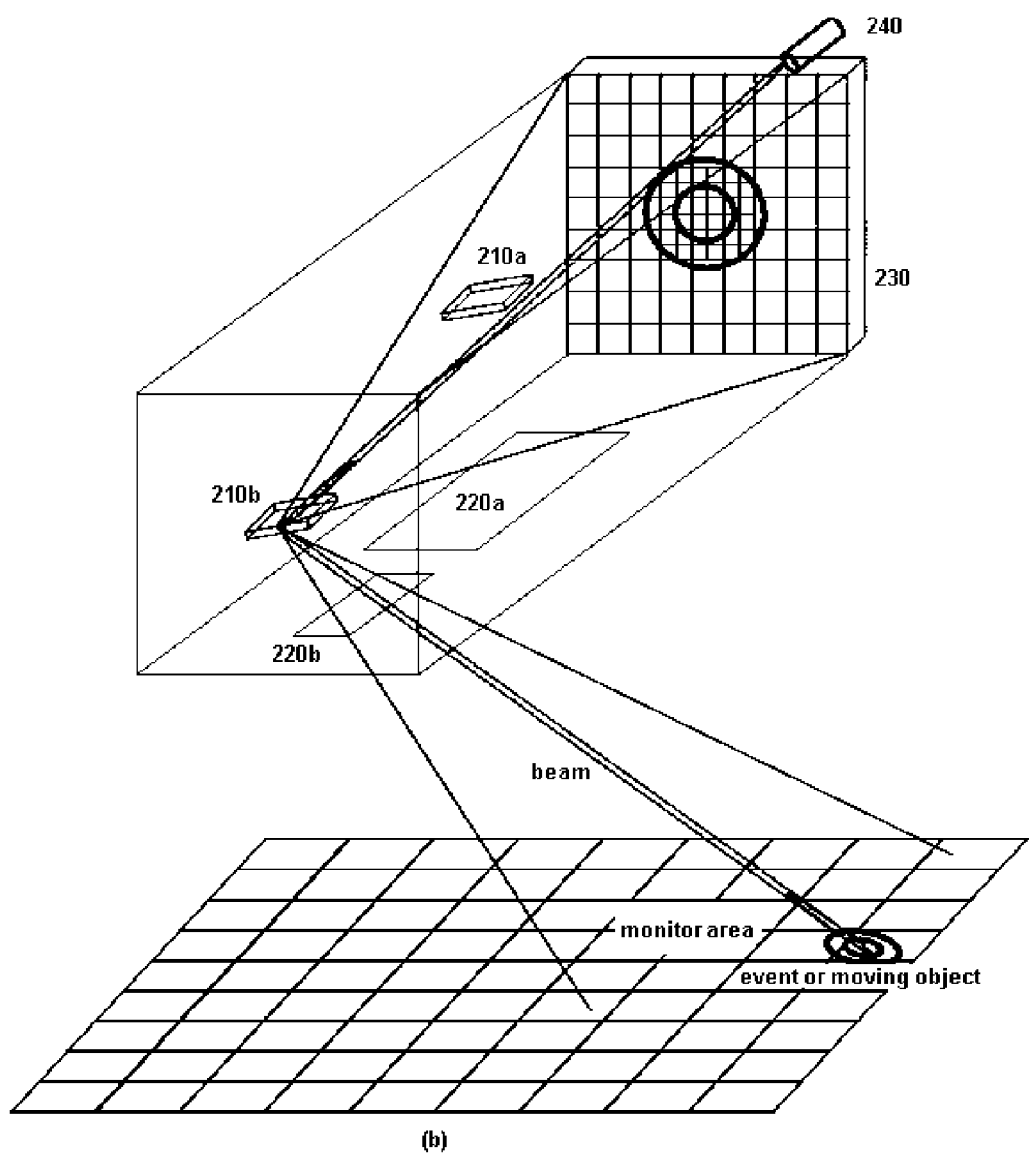
FIG. 4 is a three-dimensional view illustrating an optical module according to a second embodiment of the present invention.

The optical module according to an embodiment of the present invention may be implemented to include two or more mirror parts each of which has different FOV angles, which is described as follows, with reference to FIGS. 3 and 4. FIGS. 3 and 4 are a plane view and a three-dimensional view illustrating an optical module according to a second embodiment of the present invention, respectively. As shown in FIGS. 3 and 4, most of the elements are similar to those of FIGS. 1 and 2, and accordingly are indicated by the similar forms of reference numbers. Therefore, a description of identical elements between first and second embodiment will be omitted but a description of the different elements will be included. As shown in FIGS. 3 and 4, the optical module according to a second embodiment of the present invention further includes a wide mirror part (a first mirror part) 210a having a wide field of view angle and a narrow mirror part (a second minor part) 210b having a narrow field of view angle. In addition, it further includes apertures corresponding to the increased number of mirror parts, compared with the first embodiment. That is, it includes the apertures 220b for the minor part 210b as well as the aperture 220a for the mirror part 210a. Although the second embodiment, as shown in FIGS. 3 and 4, is implemented to include two mirror parts and two apertures, it should be understood that the present invention can be implemented in such a way to include three or more mirror parts and apertures, respectively. As the optical module according to the second embodiment further includes the minor part 210b having a narrow FOV angle, it can observe an event or a moving object in detail, as shown in FIG. 4. That is, this result can be distinctively ascertained by comparing the size of object, detected by the optical module of FIG. 4, with the size of an object detected by the optical signal detector of FIG. 2.

Figure 5:
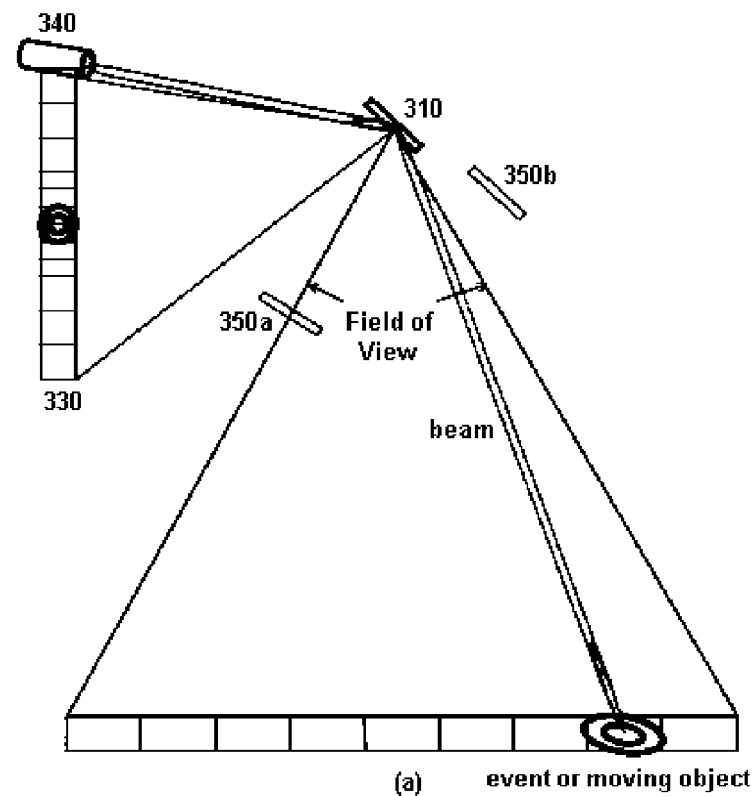
FIG. 5 is a plane view illustrating an optical module according to a third embodiment of the present invention, where the optical path is unchanged.
Figure 5:
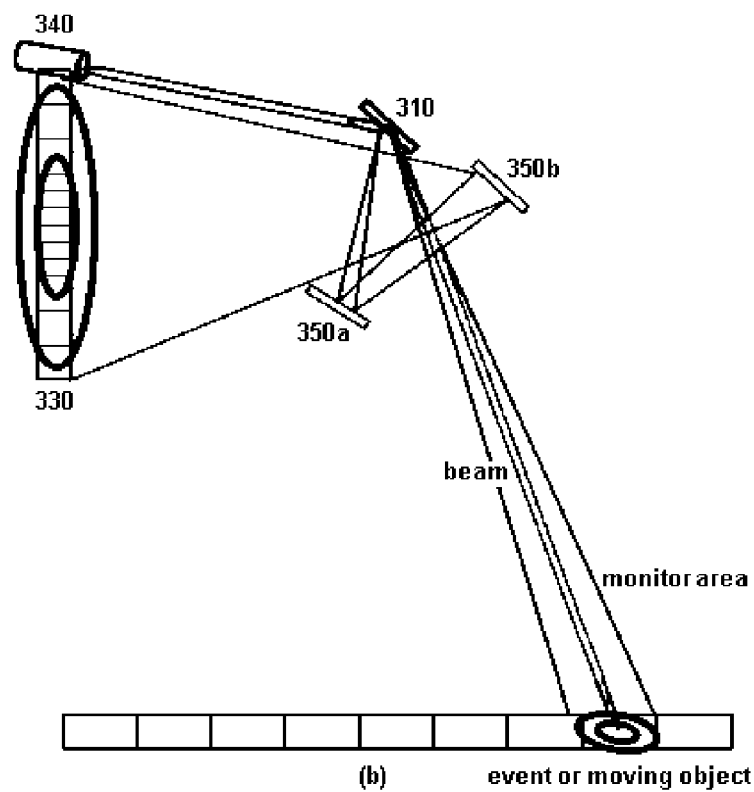

The optical module according to an embodiment of the present invention can extend the optical path between the minor part and the optical signal detector, which is described with reference to FIGS. 5 and 6. FIG. 5 is a plane view illustrating an optical module according to a third embodiment of the present invention, where the optical path is not changed. FIG. 6 is a plane view illustrating an optical module according to a third embodiment of the present invention, where the optical path is changed by a reflection mirror. As shown in FIGS. 5 and 6, most of the elements are similar to those of FIGS. 1 and 2, and accordingly are indicated by the similar forms of reference numbers. Therefore, a description of identical elements between the first and third embodiments will be omitted but a description of the different elements will be included. As shown in FIGS. 5 and 6, the optical module further includes minors 350a and 350b that serve to extend the optical path between a minor part 310 and an optical signal detector 330. Although the third embodiment, as shown in FIGS. 5 and 6, is implemented to include two mirrors, it should be understood that the present invention can be implemented in such a way to include three or more mirrors in order to extend the optical path. As the optical module according to the third embodiment further includes mirrors 350a and 350b and thus extends the optical path between the mirror part 310 and the optical signal detector 330, it can observe an event and a moving object in detail. That is, this result can be distinctively ascertained by comparing the size of object, detected by the optical module of FIG. 6, with that size of an object detected by the optical signal detector of FIG. 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An optical module comprising:
    a first mirror part for controlling its reflection angle in an analog method;
    a first aperture for controlling an amount of light incident to the first mirror part, the first aperture being installed facing the first mirror part;
    a detector for detecting an optical signal from a light transmitted from the first mirror part;
    a beam emitter for emitting a beam, the beam emitter being adjacently installed to an optical signal detector; and
    a controller for controlling the first mirror part so as to locate an object, detected by the optical signal detector, at a center portion of the optical signal detector, and for controlling the beam emitter and the first mirror part so as to emit a beam from the beam emitter to the object detected by the optical signal detector.

2. The optical module according to claim 1, further comprising:
    a second mirror part whose reflection angle is controlled in an analog method and has a different field of view angle with respect to the first mirror part; and
    a second aperture for controlling the amount of light incident to the second mirror part, the second aperture installed facing and corresponding to the second mirror part,
    wherein:
    the controller controls the second mirror part so as to locate an object, detected by the optical signal detector through the second mirror part, at the center portion of the optical signal detector, and controls the beam emitter and the second mirror part so as to emit a beam from the beam emitter to the object that is detected by the optical signal detector through the second mirror part; and
    the second mirror part is a micro-mirror or a micro-mirror array to which micro-electro-mechanical systems are applied.

3. The optical module according to claim 1, further comprising:
    at least two mirrors for changing an optical path between the first mirror part and the optical signal detector.

4. The optical module according to claim 1, wherein the first mirror part is a micro-mirror or a micro-mirror array to which micro-electro-mechanical systems are applied.

5. The optical module according to claim 2, wherein the first mirror part is a micro-mirror or a micro-mirror array to which micro-electro-mechanical systems are applied.

6. The optical module according to claim 3, wherein the first mirror part is a micro-mirror or a micro-mirror array to which micro-electro-mechanical systems are applied.

* * * * *